United States Patent

[11] 3,613,539

[72] Inventor Leslie Peter Dudley
10354 Wilshire Blvd. Apt. 1, Los Angeles, Calif. 90024
[21] Appl. No. 747,996
[22] Filed July 26, 1968
[45] Patented Oct. 19, 1971

[54] INTEGRAL PHOTOGRAPHY
3 Claims, 14 Drawing Figs.

[52] U.S. Cl. ........................... 95/18, 95/1
[51] Int. Cl. ........................... G03b 35/08
[50] Field of Search ........................... 355/33; 350/167; 95/18 P, 1; 88/1

[56] References Cited
UNITED STATES PATENTS

| | | | |
|---|---|---|---|
| 2,045,129 | 6/1936 | Ferrand | 355/33 |
| 2,202,354 | 5/1940 | Saint Genies | 355/33 |
| 3,225,651 | 12/1965 | Clay | 355/33 |
| 3,241,429 | 3/1966 | Rice et al. | 350/167 |
| 3,332,775 | 7/1967 | Mandler | 350/167 U |

Primary Examiner—John M. Horan
Assistant Examiner—D. J. Clement
Attorney—Jessup & Beecher ABSTRACT: Photographs of the integral type, exhibiting the effect of parallax about both horizontal and vertical axes, are recorded on a spherically lenticulated film or a spherically lenticulated screen-film combination by means of a modified type of camera. Light is admitted to the film via a rectangular aperture in the front of the camera instead of via the usual photographic objective. If the camera is held stationary during an exposure, the resulting photograph is pseudoscopic instead of stereoscopic. A feature of the invention is a method, comprising a sequential printing technique, by which the elementary images constituting the composite picture are so transposed that the reproduction is stereoscopic. Another feature of the invention involves lateral movement of the camera during an exposure so that the necessary transposition is accomplished within the camera. Further features of the invention reside in methods of increasing the effective stereoscopic base of the integral photographic system and methods of adapting the system to aerial photography.

INTEGRAL PHOTOGRAPHY

The present invention is concerned with an improved system of stereoscopic or three-dimensional photography. A photograph produced in accordance with one or another of the methods described in this specification exhibits optical characteristics closely resembling those of a hologram. Thus, the aspect of the recorded three-dimensional image changes with change of viewpoint about both horizontal and vertical axes. However, the new type of photograph, which may be appropriately termed an integram or integraph, possesses several important advantages over the hologram. For example, coherent light e.g. laser illumination) is not required in either taking or viewing the picture. Further advantages are: the photographic equipment employed is compact and simple to operate; exposure times correspond to those which would be required for ordinary two-dimensional photography under the same conditions; action shots and/or the use of flash present no more difficulty than with ordinary photography, and it is virtually impossible to produce an out-of-focus picture.

The photographic record constituting an integram consists of a large number of minute, juxtaposed images produced by an optical screen or reseau. The same—or a similar—screen is used when viewing the picture. In the preferred form the screen consists of transparent material embossed on one surface with an array of small lenticules or lenslets of spherical or substantially spherical curvature. The screen is so located with respect to the photographic film emulsion or other photorecording medium that the photorecording surface is at the focus of the lenticules. A convenient arrangement is for the screen-film combination to be manufactured as a composite unit, the lenticules being formed on the surface of the film base opposite the surface carrying the photosensitive emulsion.

In some applications of the present invention it is possible to employ, instead of a screen embossed with spherical lenticules, a device which may be regarded as the optical equivalent of such a screen. One type of optically equivalent screen is made from a pair of cylindrically lenticulated screens, the lenticulated surfaces of the two screens being in contact with each other, and the longitudinal axes of the lenticules of one screen being at right-angles to the longitudinal axes of the lenticules of the other screen. Another type of optically equivalent screen consists, in effect, of a sheet of opaque material pierced with a multiplicity of small apertures disposed in a regular array. In this case the apertures are not circular, like a pinhole, but are so shaped that adjacent images in the corresponding array of images are not appreciably overlapping or spaced apart; thus, apertures of square shape are very suitable. A satisfactory square-aperture screen can be produced by "crossing" two line screens which have an appropriate opaque/transparent ratio; then, by correct adjustment of the distance between the array of apertures and the sensitive surface, matters can be so arranged that adjacent images in the array are not overlapping or spaced apart by an excessive amount. There are, basically, two alternative techniques either one or the other of which may be used for production of an integram; one of these techniques is termed direct integraphy, and the other is referred to as indirect integraphy. The present application is concerned with the direct method, the indirect method being described in my copending U.S. Pat. application, Ser. No. 747,931, filed of even date herewith, entitled "Improvements in Stereoscopic Photography." The method described herein resembles that disclosed by Gabriel Lippmann in 1908 (C. R. Académie des Sciences, Vol. 146, pp. 446–51). That is to say, the lenticular film or screen-film combination is exposed direct without the use of a camera lens. The film is supported in a suitable camera body or holder during exposure. The exposure is controlled by the use of a filter or filters in front of the film and (or) by adjustment of the shutter speed, the shutter being preferably of the focal-plane type.

A minute image of the entire scene is recorded in the format of each lenticule, but the aspect of the scene represented by each such image is dependent upon the location of the associated lenticule with respect to the other lenticules in the array. Upon viewing the completed photograph, through the lenticular array, the eyes perceive the optical reconstitution or integration of the multiplicity of images which exhibits the form of a single, three-dimensional image. The degree of parallax exhibited by the three-dimensional image, about the horizontal and vertical axes, is governed by the corresponding dimensions of the format of the screen-film combination. A photograph produced in the simple manner just indicated, as in the case of one produced in accordance with Lippmann's proposal, will be seen in pseudoscopic relief instead of stereoscopic relief. It is a feature of the present invention to provide means whereby this defect can be overcome so that the resulting picture exhibits stereoscopic relief and is correctly oriented. Other features of the invention will become apparent later in the specification.

Nature of the Lenticules and Method of Manufacture

In the applicant's copending U.S. Pat. application, Ser. No. 747,931, referred to above, there is a detailed discussion of the optical properties of the individual lenticules and methods of manufacturing lenticular film and screens suitable for use in connection with the invention. Such film and screens are also suitable for use in connection with the invention described herein. However, it is generally desirable for lenticules designed for use in the direct method to have a greater acceptance angle than those used in the indirect method. In the case of the direct method, the angular coverage of the photographic system is limited by and to the acceptance angle of the lenticules. On the other hand, in the case of the indirect method, the angular coverage of the system is governed solely by that of the camera lens. Thus, the angular coverage can be varied by the simple expedient of changing the lens. In most practical cases the angular coverage of the lens is in excess of the acceptance angle of the lenticules.

BASIC PRINCIPLE

Figure 1:
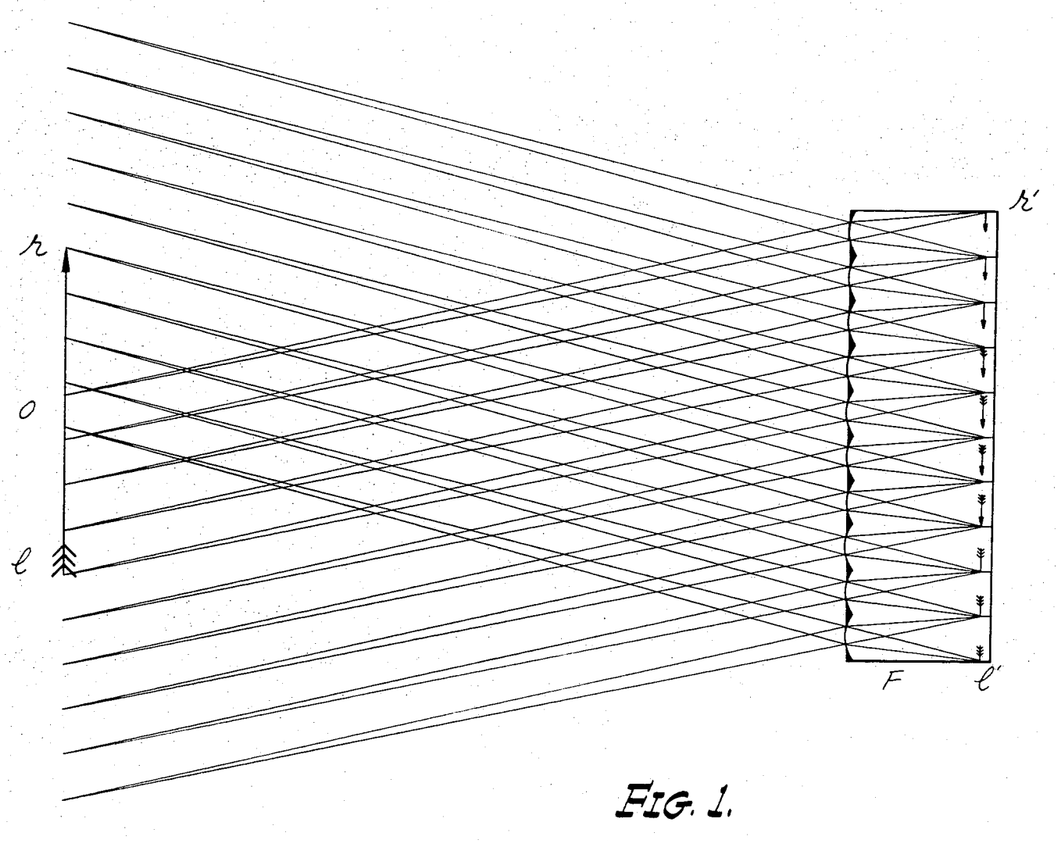
FIG. 1 is a simplified diagram representing a piece of spherically lenticulated film recording an integral photograph.

FIG. 1 is a simplified diagram representing a piece of spherically lenticulated film (or screen-film combination) F recording an integral photograph of an object O. As will be understood, the lenticules are shown greatly enlarged for the sake of clarity. It is to be assumed that the diagram represents a plan view, the left and right edges of the object being denoted by respectively $l$ and $r$, the corresponding edges of the film being denoted by $l'$ and $r'$. It will be observed that the aspect of the little image formed at the focus of each lenticule is dependent upon the location of the lenticule relative to the object, the aspect changing progressively from an extreme leftward view at the edge *l'* of the film to an extreme rightward view at the edge *r'*. In addition to the single row of lenticules illustrated, there are, of course, further, parallel rows of lenticules which must be imagined as disposed in a plane normal to the surface of the drawing. Accordingly, the images recorded by the lenticular array differ in respect of both vertical and horizontal parallax.

Let us now imagine that the processed film is viewed by an observer located in front of the lenticules at some position such as that occupied by the object O in FIG. 1. Then the leftward aspects of the image will lie to his right and will be seen predominantly by his right eye, while the rightward aspects will lie to his left and will be seen predominantly by his left eye. In consequence, the integral image will be seen pseudoscopically. It will also appear upside down or inverted due to the inversion of each little image element resulting from the action of the associated lenticule. If, now, the piece of film be rotated through 180° in its own plane in order to compensate for this inversion, the integral image will be laterally inverted or perverted so that it will again be seen pseudoscopically. In short, in order that the completed photograph may be seen in stereoscopic relief, it is necessary for the individual picture elements to be appropriately reoriented or transposed. The situation is similar to that prevailing when a simple stereogram or stereoscopic pair of photographs has been recorded on a single plate or piece of film; the two views, or reproductions thereof, must be laterally transposed in order that they may be viewed in stereoscopic relief in a stereoscope.

In order that the integral image shall appear sharp, clear and undistorted, it is necessary to provide means for avoiding the formation of secondary or parasitic images. One such means is to arrange, in the manufacture of the lenticular film or other screen-film combination, for each lenticule to be isolated from the adjacent lenticules by a surrounding boundary composed of some opaque substance. This substance may take the form of a photographic emulsion, applied to the lenticulated surface in a thin layer so that it surrounds, without completely covering, the lenticules. The layer is then exposed to light and chemically developed in order to render it both black and opaque. As will be understood, this stage of the manufacturing process is carried out prior to application of the photorecording layer or layers in those cases in which the lenticular screen is an integral part of the film. An opaque layer of this type is represented in FIG. 1 by the dark areas between the lenticules. As an alternative, or in addition, to the use of such a layer, it is possible to use a lightshield or hood extending outward from the edges of the film format.

The Transposition Process

Figure 2:
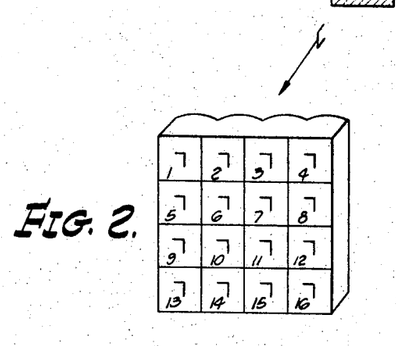
FIG. 2 is a perspective view representing a piece of spherically lenticulated film recording an integral photograph.
Figure 3:
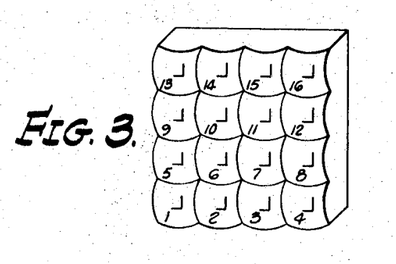
FIG. 3 shows the piece of film in FIG. 2, viewed through the lenticules, subsequent to processing and being rotated through 180° in the image plane.
Figure 4:
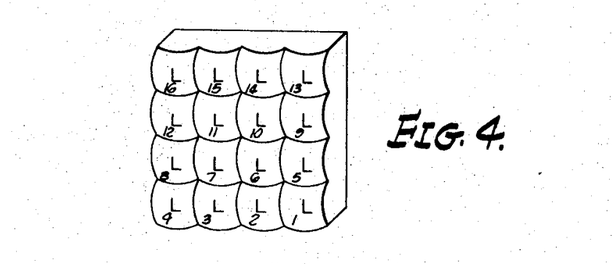
FIG. 4 represents a contact (emulsion-to-emulsion) print from the original photograph in FIG. 3.

FIG. 2 depicts, greatly enlarged, a small piece of spherically lenticulated film recording an integral photograph of some three-dimensional subject represented by the large letter L, the general direction of the image-forming rays being indicated by the arrow. As will be noted, the piece of film is embossed with 16 lenticules, in square array. The elementary images formed by the lenticules are numbered consecutively from 1 to 16. Images Nos. 1, 5, 9 and 13 represent the extreme leftward aspects of the subject; Nos. 4, 8, 12 and 16 represent the extreme rightward aspects; Nos. 1, 2, 3 and 4 represent the extreme upper aspects; Nos. 13, 14, 15 and 16 represent the extreme lower aspects, and Nos. 6, 7, 10 and 11 represent intermediate aspects, as will be understood. If the processed film, erected in order to compensate for the image-inversion due to the action of the lenticules, is now viewed through the embossed surface, the orientation of the elementary images will be as shown in FIG. 3; thus, the images will be laterally inverted or perverted, in consequence of which the integral image will be pseudoscopic. A further point, but one of minor consequence, is that the effect of vertical parallax will be exhibited in a manner opposite to that occurring in everyday visual experience. This is due to the interchanging of the horizontal rows of images as indicated in the drawing. A contact (emulsion-to-emulsion) print from this photograph onto a second, matching piece of lenticular film will bring about the result represented by FIG. 4. In this case the integral image will again be pseudoscopic since, although each individual elementary image is correctly oriented, the leftward aspects are located to the right of the observer, and the rightward aspects are located to his left. Vertical parallax will be exhibited in the same manner as by the arrangement shown in FIG. 3. Clearly, the ideal or perfect solution to this problem would be provided by (a) rotation of each elementary image through 180° within its own format, followed by (b) the making of a contact (emulsion-to-emulsion) print. This would yield the arrangement shown in FIG. 5, resulting in an integral image which is stereoscopic and free of error in respect of vertical parallax. However, as discussed at length in the applicant's copending U.S. Pat. application, Ser. No. 747,931, it is a demonstrable fact that stereoscopic photographs which exhibit reversed vertical parallax are entirely acceptable to the observer; indeed, this type of defect will generally pass completely unnoticed. Thus, the arrangement of the elementary images which is represented in FIG. 6 also constitutes a satisfactory integram, as the resulting integral image is correctly oriented and stereoscopic. Means whereby integrams of the types represented in both FIGS. 5 and 6 can be produced constitute features of the present invention.

The transposition process with which the invention is concerned involves a sequential printing technique which can be followed with the aid of FIGS. 7 to 10. These four schematic drawings represent a time-spaced sequence of steps by which the original integral photograph in FIG. 3 can be used to print the integram represented in FIG. 6.

Figure 6:
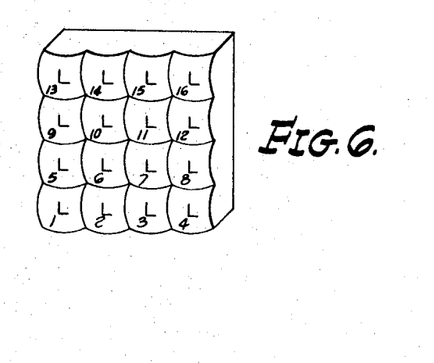
FIG. 6 represents a further type of print which can be obtained, by means of a single transposition process, from the original photograph in FIG. 3.
Figure 7:
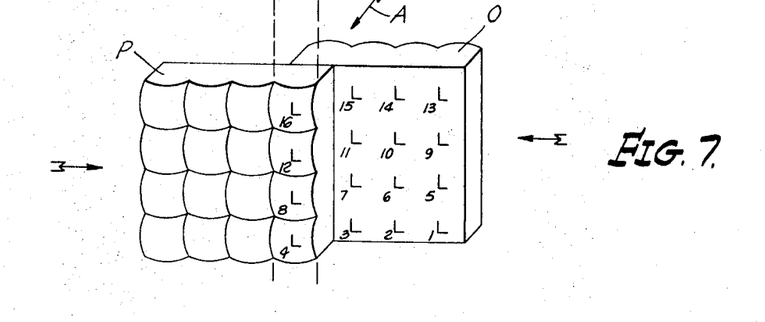
FIGS. 7 through 10 constitute a series of diagrams illustrating the principle of the transposition process.
Figure 8:
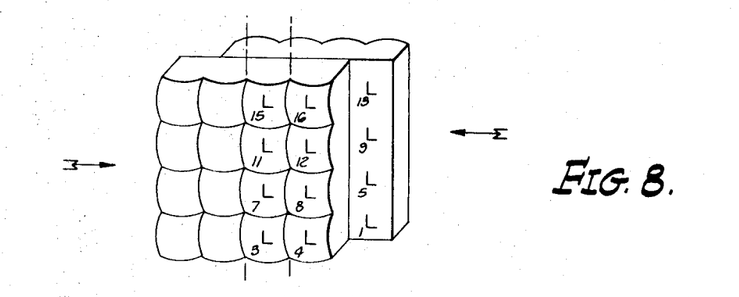
Figure 9:
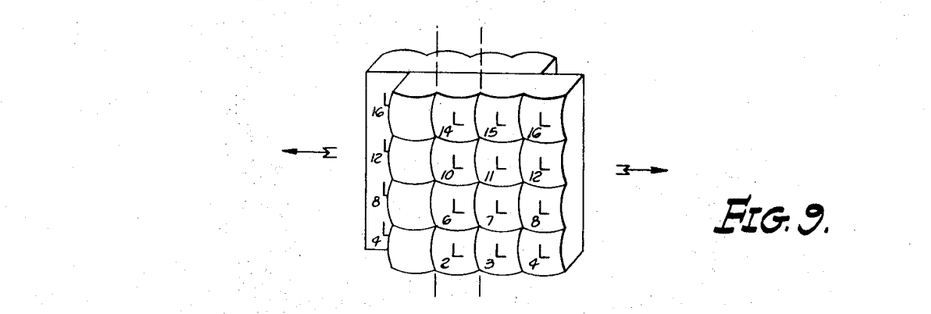
Figure 10:
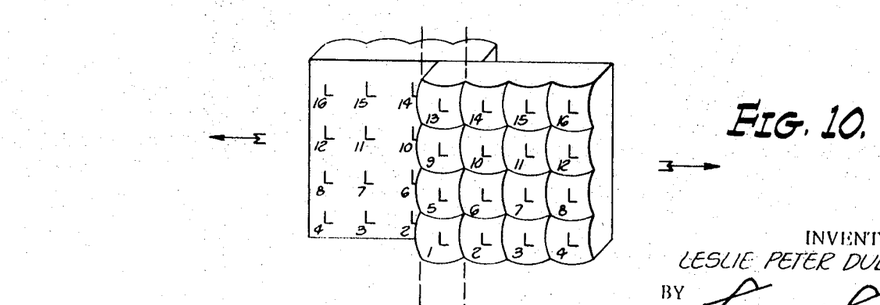

Referring to FIG. 7, the original photograph, denoted by O, is placed in emulsion-to-emulsion contact with the matching piece of lenticular material P on which the reproduction is to be printed, the left-hand column of lenticules on O being opposite the right-hand column of lenticules on P. The general direction of the printing light rays is indicated by the arrow A. The width of the strip of emulsion being exposed is restricted to the lenticular pitch distance; this can be accomplished by any suitable means, such as by admitting the light via a narrow slit, narrow cylindrical lens, or other convenient arrangement. Thus, in FIG. 7, just those images numbered 16, 12, 8 and 4 are printed. Referring now to FIG. 8, it will be noted that the photograph O has been transported to the left through a distance equal to the lenticular pitch, and that the film P has been transported to the right through the same distance; accordingly, the images numbered 15, 11, 7 and 3 can now be printed to the left of the column of images first reproduced. In FIG. 9 the two pieces of photographic material are depicted as having been again transported, in opposite directions, through a distance equal to the lenticular pitch, making it possible for the third column of images to be printed. FIG. 10 shows, finally, the printing of the fourth and last column of images, the completed integram now being of the type represented in FIG. 6.

The foregoing method of accomplishing the desired result has been selected for description simply as an example of the general principle involved. Various modifications of the technique are possible. The essential feature is that, between successive steps in the printing operation, there must be relative movement between the two films, plates or the like through a distance equal to twice the lenticular pitch. Accordingly, it is not necessary for both pieces of photographic material to be transported laterally. Thus, the piece denoted by P in the diagrams can be held stationary while that denoted by O, together with the printing aperture or equivalent, is transported laterally through twice the distance(s) indicated in the preceding explanation of the process. In the method preferred by the applicant, the piece of photographic material O, together with the printing aperture, is held stationary while the piece of photographic material P is transported.

If desired, the aforementioned relative movement between the two pieces of photographic material can be intermittent, printing light being admitted only during the stationary periods. However, the applicant considers it to be more practical and convenient for the movement to be continuous; the light source (e.g., electronic flash) is so synchronized with the film transport mechanism that a light pulse is emitted each time the film has moved through the prescribed distance. Provided that the duration of a pulse is a small fraction (e. g., one-hundredth) of the time taken by a lenticule to move past the printing aperture, no perceptible image-smear will result. As an alternative to electronic flash, a source of continuous illumination can be employed, the light being occulted intermittently by means of a synchronously driven shutter, or switched on and off by a synchronously operated commutator device.

Figure 5:
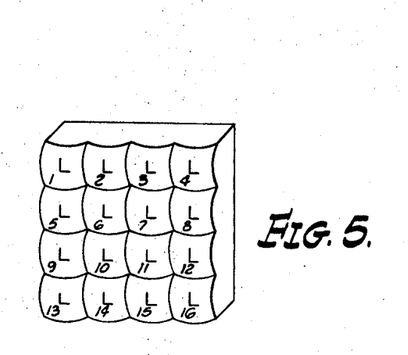
FIG. 5 represents one type of print which can be obtained, by means of a two-stage transposition process, from the original photograph in FIG. 3.

By repeating the transposition process, but using a vertical scan instead of the original horizontal scan, an integram of the type shown in FIG. 10 (or FIG. 6) can be converted into one of the type shown in FIG. 5. However, for the reason previously indicated, this second scanning operation is considered to be unnecessary in the majority of practical applications of the process.

No basically new mechanism is required in order to accomplish the transposition process. The accurate transport mechanism which is necessary is available in, for example, ruling engines of the types used for producing fine-pitch line screens and diffraction gratings. (A portion of a typical ruling engine, modified for the manufacture of spherically embossed lenticular film, is illustrated in the applicant's copending U.S. Pat. application, Ser. No. 747,931.) To one skilled in the art, the provision of the necessary light-tight enclosure, film platens, illuminating means, etc., will not present difficulty.

Copies of integrams of the types represented in FIGS. 5 and 6 can be made by any of the techniques described in the patent application mentioned above.

Camera for Recording Integral Photograph

Figure 11:
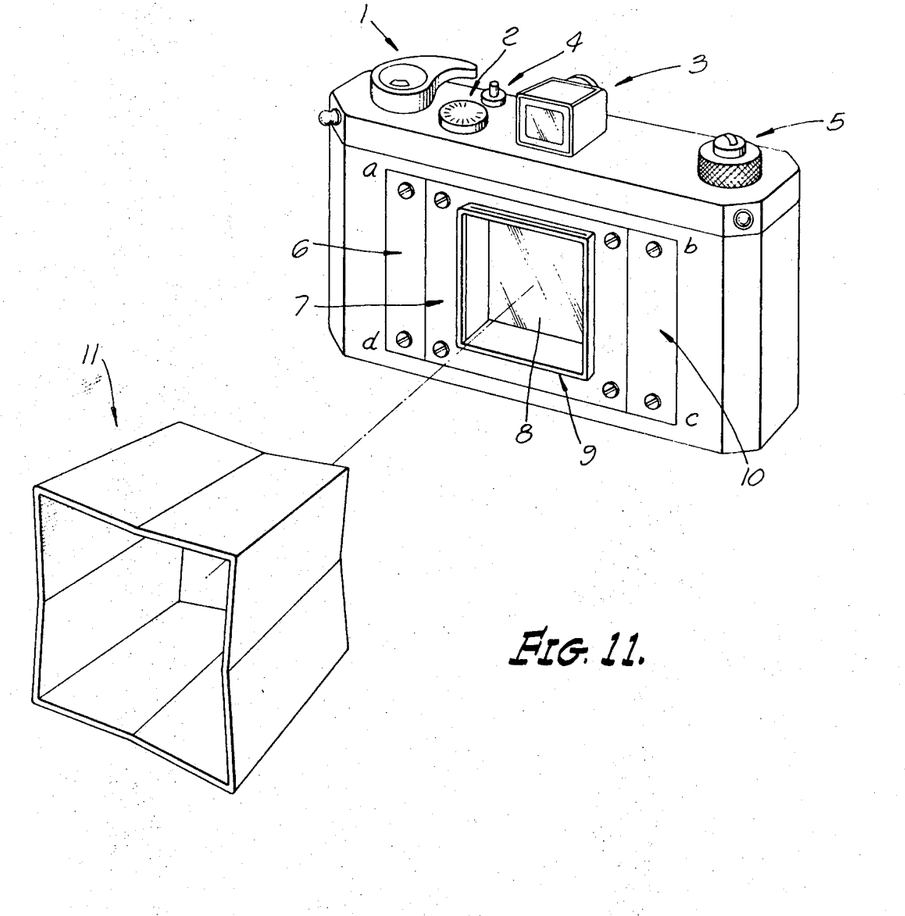
FIG. 11 shows a form of camera suitable for taking photographs in accordance with the invention.

FIG. 11 shows an example of an instrument for use in image-recording in accordance with a feature of the invention. This can be either an instrument designed specifically for the purpose or, alternatively, a regular camera which has been appropriately modified.

Although no camera lens is used, it is necessary that the equipment employed shall embody certain physical and mechanical features which are common to the majority of regular photographic cameras. The main features which are considered to be essential are the following: a housing (e.g., camera body), container or film holder for supporting the film or other photosensitive material during image-recording, and for protecting said material from unintentional exposure to light; some means (e.g., variable-speed focal plane shutter) of admitting a controlled amount of light from the subject to the photosensitive surface via the lenticules; means (e.g., film-advance mechanism or a set of cut-film holders) for bringing a fresh, unexposed area of photosensitive material into position after an exposure has been made, and some form of viewfinder.

Consider now that the sketch of FIG. 11 represents a camera, designed originally for use with 35 mm. or, say, 2½ inch-wide roll film. Assume, further, that the camera is equipped with a focal plane shutter, actuated by the shutter-release button 4. The film-advance and shutter-cocking lever is denoted by the numeral 1 in the sketch, 2 denotes the shutter speed-adjustment knob, 3 denotes the viewfinder, and 5 denotes the film-rewind knob and lever. (The latter control is, of course, required only if cassette-loading is employed.) As will be noted, the camera lens has been removed, and it is to be assumed that a rectangular aperture a b c d has been cut in the front of the camera body. The width (major dimension) of this aperture is preferably about equal to the length of that portion of film which extends between the two spools and is held flat in the focal plane. Thus, the width can be assumed to be somewhat greater than that of the picture format for which the camera was originally designed. For the sake of simplicity, it will be assumed that the width is equal to twice that of the original format.

In the example arrangement illustrated, two equal rectangular portions at the left and right sides of the aperture have been closed by the insertion of a pair of opaque plates 6 and 10. These plates can be easily removed, when required, for a purpose to be described later. A further, larger plate 7 is inserted between plates 6 and 10, a rectangular or square aperture 8 having been cut in the center portion of this larger plate. The dimensions of this aperture are substantially the same as those of the original format. Into this aperture is inserted a thin walled, framelike component 9 which protrudes outward from the camera body for a short distance and inward so that the rear edges are in contact with a sheet of clear glass. This sheet of glass, the surfaces of which are preferably optically coated, extends over the entire area bounded by the rectangle a b c d. The purpose of the glass is to protect the shutter, film, etc., against ingress of dust or other extraneous matter. The portion of the frame 9 which protrudes outward from the camera body can, if desired, be slotted to receive filters of various types, such as color filters, polarizing filters, etc. An additional, desirable accessory, denoted by 11 in the sketch, is a sun shield designed for fitting around, and attachment to, the front portion of the frame 9.

Modified as shown in FIG. 11, the equipment is now adapted for recording, on suitable spherically lenticulated film, integral photographs each of which will be constituted of an array of microscopic images extending over an area of film corresponding to that of the original format. As will be understood, the magnitude of the three-dimensional effect will be governed by the dimensions—primarily the horizontal dimension—of that format. Now, in the case of a camera of the type illustrated, the length of that dimension will generally be less than 21/2, inches, so that the three-dimensional effect will be less than normal. However, the stereoscopic base can be increased, if desired, with the aid of the removable plates 6, 7 and 10 in the manner now to be described.

On the basis of the assumption, made previously, that the horizontal dimension of the rectangular aperture a b c d is equal to twice the width of the original format, it follows that removal of plates 6, 7 and 10 will double the length of the strip of film exposed when the shutter is actuated. Accordingly, the amount of horizontal parallax, and hence, the three-dimensional effect, will also be doubled. The number of exposures that can be made on a given length of film will, of course, be halved. If the instrument employed is a regular camera which has been modified, rather than an instrument which has been designed specifically for the present purpose, there are some further points to be borne in mind if the feature just described is to be utilized. For example, the width of the gate aperture will generally have to be increased; so, too, will the distance traversed by the focal plane shutter. Another point relates to the feature—common to many so-called miniature and small-format cameras which provides interlocking of the film-advance (and shutter-cocking) lever and the shutter-release button. The interlocking mechanism prevents double exposure on a single frame of film, and also obviates film wastage by preventing the operator from advancing a further frame of film into position until the shutter-release button has been pressed. Hence, in order to make a series of exposures each of which occupies a length of film equivalent to two regular frames, we can adopt one or the other of two procedures. One of these procedures is to modify the mechanism in such a way that the film-advance and shutter controls can be operated independently; the film can then be advanced through the required distance equal to the width of two regular frames without the necessity for pressing the shutter-release button after the film has moved through one-half of that distance. The other, more simple, procedure involves no modification to the camera mechanism; it involves merely the provision of an opaque mask or blind for occulting light from the aperture

*a b c d* when, after the film has moved through one-half of the total required distance, actuation of the shutter is rendered necessary by the interlocking mechanism. Just as it is desirable for a frame 9 and sun shield 11 to be employed in conjunction with the small aperture 8, so, too, is it desirable for a larger, appropriately shaped frame and sun shield to be used in conjunction with the aperture *a b c d*. With the plates 6 and 10 in position, as indicated in the sketch, but with the plate 7 removed, it will be evident that the area of film occupied by each exposure is greater than that of the original format but less than that of the aperture *a b c d*. It is, of course, desirable for an appropriately shaped frame and sun shield to be used in conjunction with this intermediate-sized aperture also.

If an intermediate-sized aperture, as indicated above, is to be employed, it is preferable for the entire apparatus to be specially designed; in modifying a regular camera to include this feature, it is likely that problems will arise in connection with the film transport mechanism, frame counter, etc.

Use of Auxiliary Optical System

Figure 12:
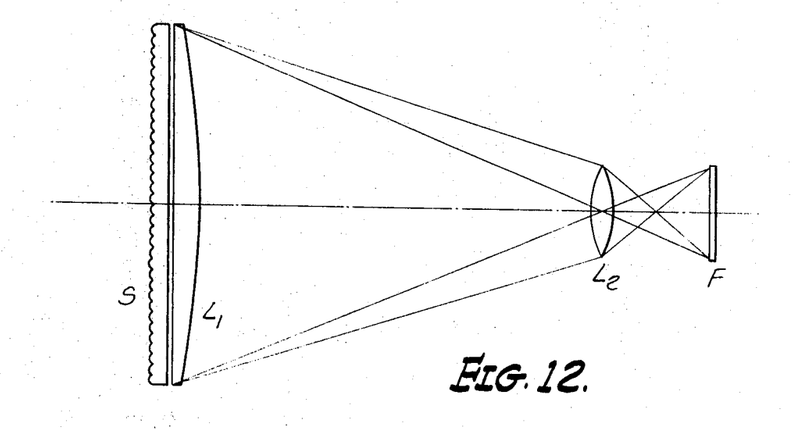
FIG. 12 is a diagram showing an optical method of extending the stereoscopic base of an integral photographic system.

FIG. 12 is a schematic diagram showing how the stereoscopic base of an integral photographic system can be extended beyond the limit imposed by the dimensions of the film or image format.

Referring to the sketch, S denotes a spherically lenticulated screen the transverse dimensions of which are relatively large compared with those of the image format F. The screen forms a multiplicity of small images, at its focal plane, of the complete scene or subject. This array of images is reproduced, to a reduced scale, in the format F of the lens $L_2$. It is preferable for a field lens $L_1$ to be located at, or in close proximity to, the focal plane of the screen S. As will be understood, the image-recording medium at F may be photographic film, the photosensitive face of a television camera tube, or any other type of image-recording or image-receiving medium.

Use of an auxiliary optical system, in the way indicated above, does not change the nature of the integral image from pseudoscopic to stereoscopic; this is because introduction of the lens $L_2$, with or without the field lens $L_1$, simply causes inversion of the array of elementary images as a whole, and does not cause inversion of each elementary image within its own individual format. Hence, transposition of these images must still be accomplished by, for example, the sequential printing process described earlier in the specification As an alternative to that process, an electronic scanning technique or its optomechanical equivalent (i.e., scanning by means of a lightspot instead of an electron beam) can be employed. Transposition by scanning is particularly useful in television applications of the invention. Thus, an image formed in, say, the upper left-hand corner of the format of a television camera can be reproduced, after transmission to a television receiver, in the corresponding corner of the picture tube or in any one of the other three corners, depending upon the arrangement of the scanning circuitry. As will be understood, the faceplate of the picture tube of the receiver must be embossed with lenticules distributed in an array which corresponds with the lenticular array used in transmission. This matter and related topics are discussed in more detail in the applicant's copending patent application to which previous reference has been made.

Referring, once more, to FIG. 12, when the image format at F is that of a television camera tube, it is, of course, unnecessary for the faceplate to be lenticulated. If, however, the format at F is that of a piece of photographic film or the like, the material may be either lenticular or nonlenticular depending upon the manner in which it is to be treated after exposure and processing. For example, assuming a regular photographic plate is employed, the orientation of the elementary images recorded will be as shown in the earlier diagram FIG. 3. These images can then be reoriented, by the transposition process already described, in the way shown in FIG. 5 or that shown in FIG. 6. A suitable, matching lenticular screen can then be laminated to this reproduction so that the picture can be seen in stereoscopic relief. If, on the other hand, a piece of lenticular film is placed at F, the lenticules on the film matching, to an appropriately reduced scale, those on the screen S, the transposition process is rendered unnecessary. This is due to the fact that the additional image-inversion caused by the lenticules on the film results in the elementary images becoming oriented as represented in FIG. 5. However, this is difficult to accomplish in practice owing to the high degree of precision with which it is necessary for the lenticules on the film to be matched with those on the screen S.

Mechanical Amplification of Stereoscopic Base

In the applicant's U.S. Pat. No. 2,572,994 (corresponding to British Pat. No. 656,165) there is a description of a type of camera mounting so designed that a camera supported thereon can be moved laterally through a predetermined distance during the exposure period. This mounting is intended primarily for use in the taking of stereoscopic photographs of the type known as parallax panoramagrams. However, a mounting of this nature, or a simplified form thereof, can be usefully adapted to form a feature of the present invention as described below.

Figure 13A:
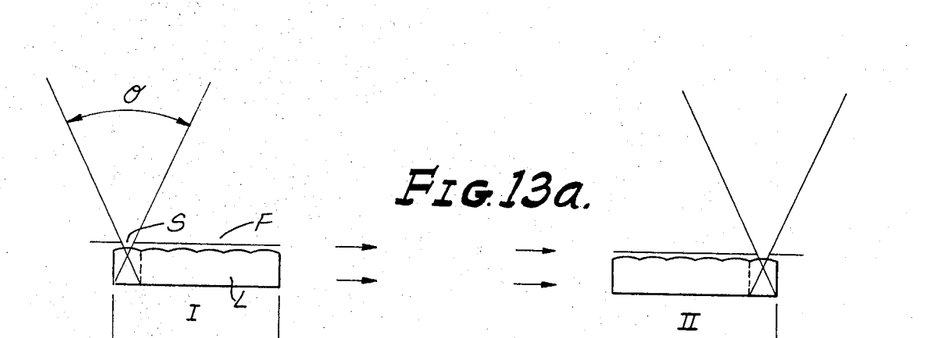
FIGS. 13a and 13b are diagrams showing mechanical methods of extending the stereoscopic base of an integral photographic system.

FIG. 13*a* is a schematic plan view representing a piece of lenticular film L being exposed to light entering through the vertical slit S in a focal-plane shutter F. The angular field of the lenticules is denoted by $\theta$. It is to be imagined that the film and shutter are contained within a suitable piece of photographic apparatus or camera as discussed earlier in the specification. It is to be assumed, further, that the apparatus, supported on a suitable mounting, is transported laterally from position I to position II during the time taken by the shutter slit to traverse the width of the film format. In this pair of diagrams the film and shutter slit are depicted as moving in the same direction. In consequence, extreme leftward images of the scene are recorded on the left-hand edge of the film, and extreme rightward images are recorded on the right-hand edge, just as if the film had remained stationary during exposure. However, the horizontal parallax or stereoscopic base has been increased by an amount equal to the distance through which the film has moved. In the example illustrated, the width of the film is denoted by *w*, and the distance through which it has moved amounts to 3*w*; hence, the stereoscopic base has been increased from *w* to 4*w*. The orientation of the elementary images is as indicated in the earlier diagram, FIG. 2, so that the integral photograph is pseudoscopic. Hence, in order to produce an integram of the type represented in FIG. 6, transposition about one axis must be performed. If an integram of the type represented in FIG. 5 is required, transposition must be performed about two axes.

Figure 13B:
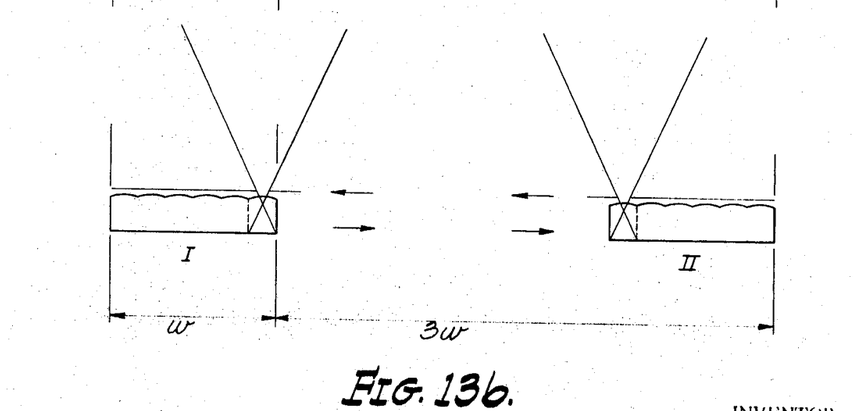

FIG. 13*b* is a diagram similar to FIG. 13*a*, but in this case the film and the shutter slit are represented as moving in relatively opposite directions. As a result of this arrangement, extreme leftward views of the scene are recorded on the right-hand edge of the film, and extreme rightward views are recorded on the left-hand edge. In this case, the resulting stereoscopic base is equal to the distance through which the film has moved minus the width of the film, amounting, in the example illustrated, to 3−*w*=2*w*. An important consequence of this type of arrangement is that a contact (emulsion-to-emulsion) print from the original photograph results in the production of an integram of the form presented in FIG. 6, transposition about the horizontal axis having been already accomplished during the photographic operation. Further transposition, about the vertical axis, results in the production of an integram of the type represented in FIG. 5.

With photographic systems of the type under discussion it is necessary to ensure that no perceptible image-smear results from the lateral movement of the film. The principal requirements are:

1. The parallax angle should not be excessive,—generally not more than about 15° to 25° in the case of the nearest foreground object. That is to say, the angle subtended at any point in the scene or subject by the total stereoscopic base line should not be greater than about 15° to 25°.

2. The slit in the focal plane shutter should be narrow,—generally not wider than the lenticular pitch distance, although the slit may have a width in excess of this limit if the parallax angle is small and the lenticular pitch is fine.

Aerial Photography

The principle described in the preceding section can be usefully applied to integral photography from a moving vehicle, such as an aircraft or a spacecraft. In this case, however, the mounting referred to above is not required, the translatory movement of the film relative to the subject (e.g., terrain) being effected by the forward motion of the vehicle. It is preferable for the photographic equipment to be supported in a mounting which pivots in such a manner that, throughout the exposure period, an imaginary straight line extending from the center of the film format, and normal to the surface thereof, passes through substantially the same point in the target or scene being recorded. The mounting can be stabilized, by methods known to those conversant with the art, to minimize the effects of undesired motion of the vehicle, such as pitch, roll and yaw.

The direction of motion of the focal plane shutter slit should be substantially parallel to the flight axis. Further, in order that the film may be viewed stereoscopically, and not pseudoscopically, immediately after processing, the shutter slit should move in a direction opposite to the direction of flight.

Having fully described my invention, it is to be understood that I am not to be limited to the details herein set forth but that my invention is of the full scope of the appended claims.

I claim:

1. A photograph of the integral type comprising backing means supporting an image-recording layer on which is recorded an array of elementary images of different aspects of the same scene, the aspect of the scene represented by each such elementary image being dependent upon the location of that image with respect to the others in the array, the individual elementary images being so positioned that, whereas each such image is correctly oriented with respect to its horizontal and vertical axes, and whereas the images are arranged in sequence along the horizontal axis of the array so that those images corresponding to more leftward aspects of the scene are reproduced in the left-hand portion of the array and those images corresponding to more rightward aspects are reproduced in the right-hand portion of the array, the said images are arranged in sequence along the vertical axis of the array so that those images corresponding to upper aspects of the scene are reproduced in the lower part of the array and those images corresponding to the lower aspects of the scene are reproduced in the upper part of the array.

2. The photograph claimed in claim 1, and which includes a transparent viewing screen applied to the surface of said photograph, the viewing screen having lenticules of substantially spherical curvature formed on the front surface thereof, the rear surface being in contact with the image-recording layer, the said image-recording layer being located substantially at the focal plane of said viewing screen.

3. The photograph claimed in claim 2, and which comprises a composite structure, the image-recording layer being a photosensitive layer applied to one surface of a transparent photographic film base the opposite surface of which has spherical lenticules formed thereon.